Sept. 6, 1949.　　　　I. F. LUNDQUIST　　　　2,480,942
SAWING MACHINE
Filed Sept. 4, 1946　　　　　　　　　　　　4 Sheets-Sheet 1
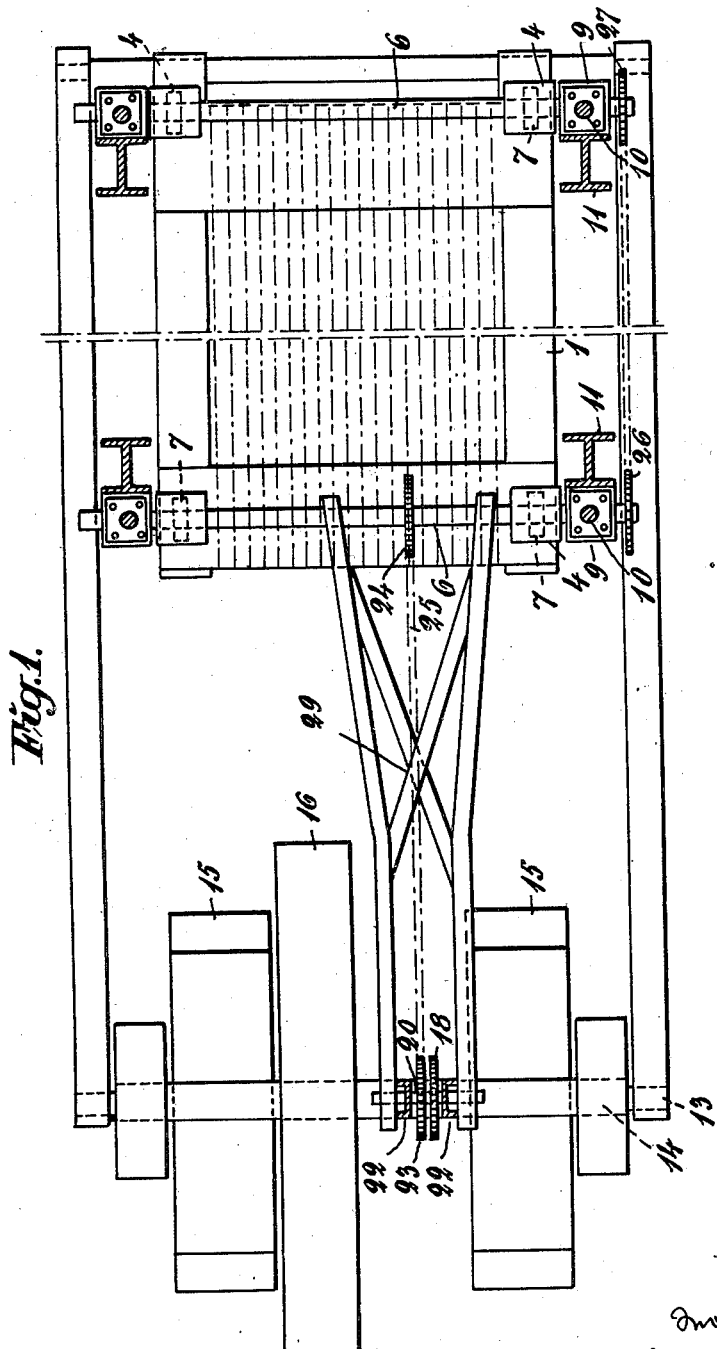

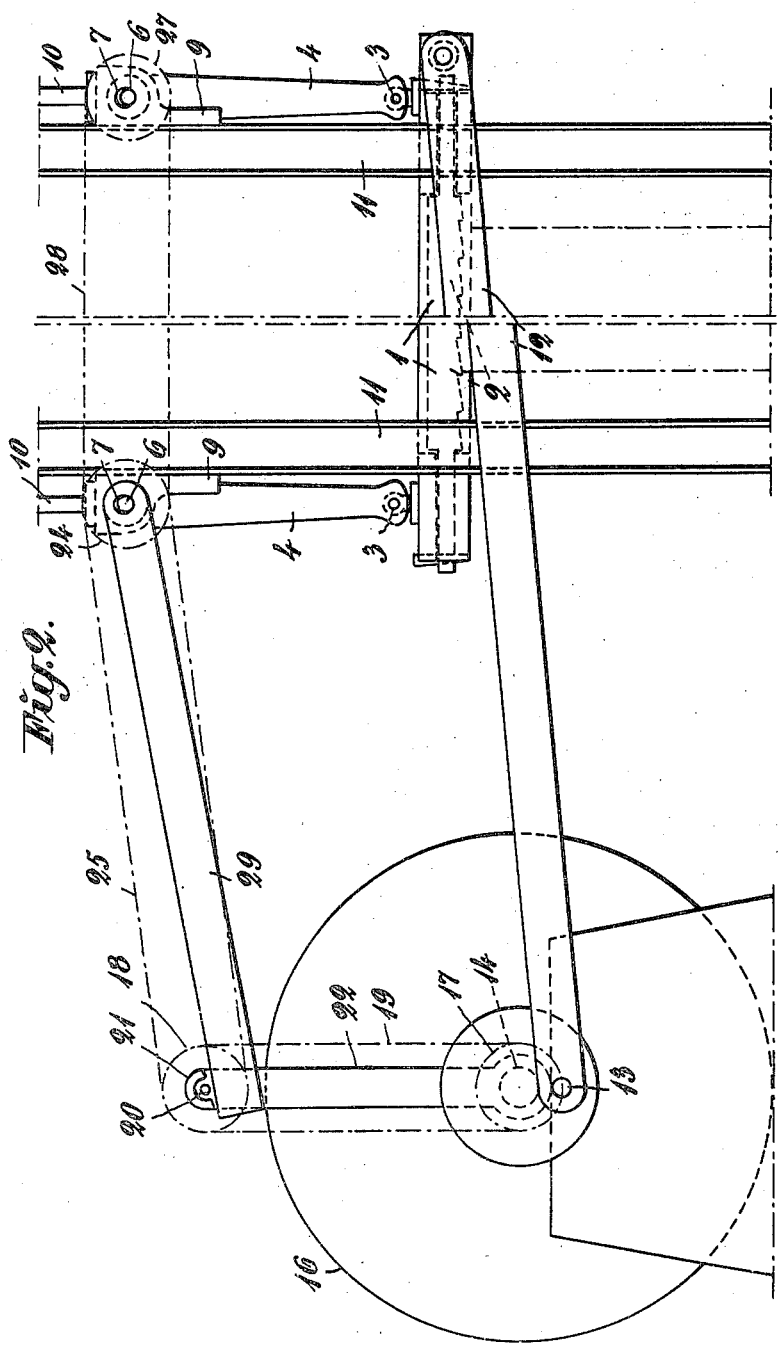

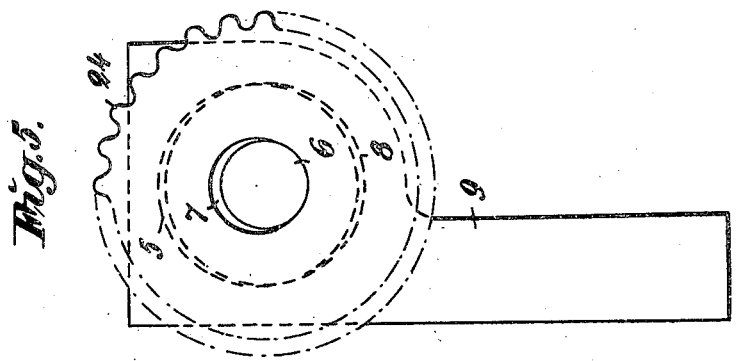
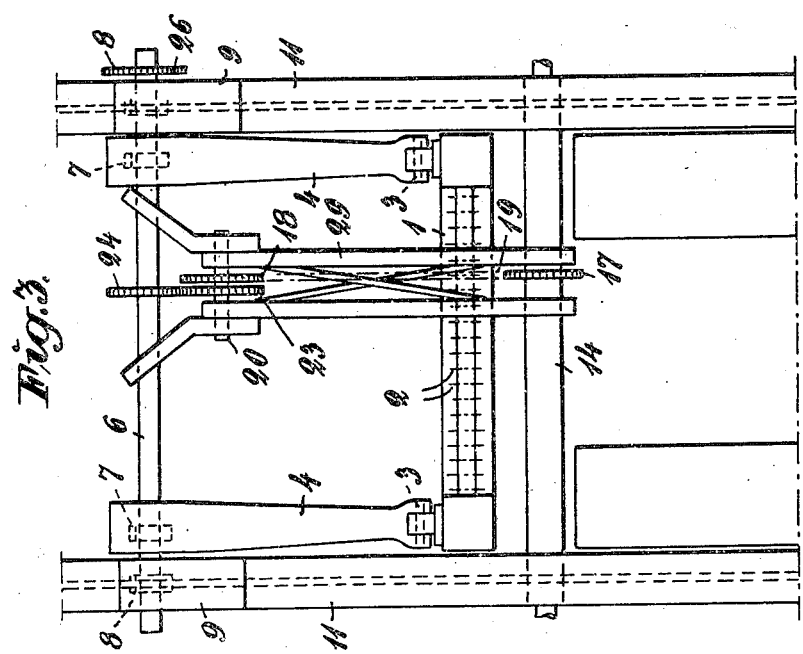

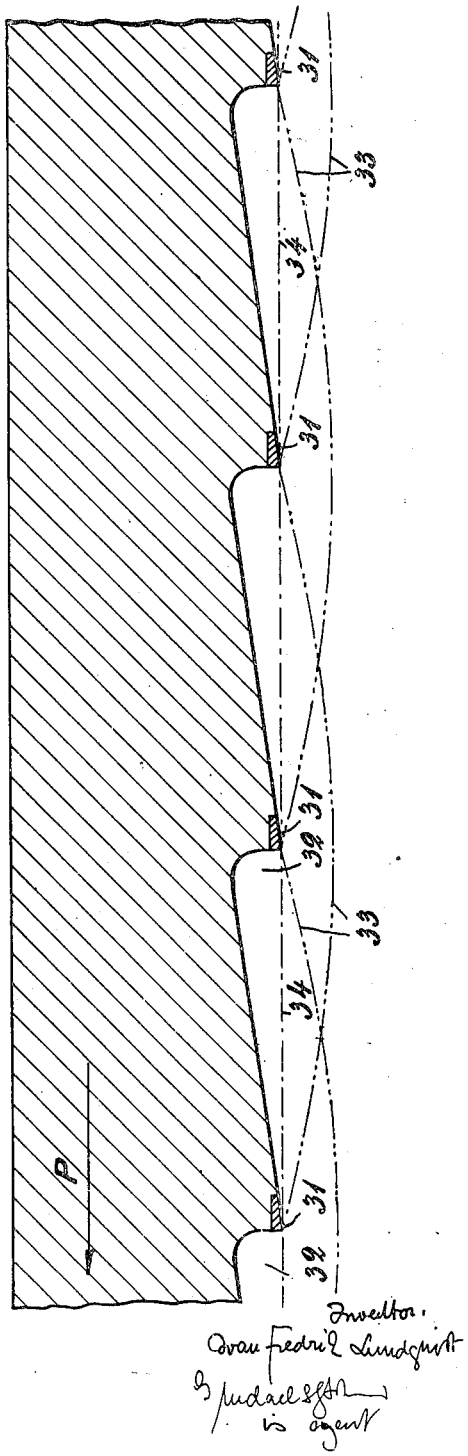

Patented Sept. 6, 1949

2,480,942

UNITED STATES PATENT OFFICE 2,480,942

SAWING MACHINE

Ivan Fredrik Lundquist, Norrkoping, Sweden

Application September 4, 1946, Serial No. 694,783
In Sweden September 20, 1945

5 Claims. (Cl. 125—16)

This invention relates to a machine for sawing stones or the like.

For sawing so-called raw tables out of stone blocks, as a rule framesaws or linesaws are used, having sawblades with smooth under edges, i. e. with no teeth. The sawing operation is performed by supplying water and sand to the stone block beneath the sawblade while the latter is moving to and fro in engagement with the stone under a suitable pressure. It is thus the sand particles which hereby effect the sawing operation proper by grinding against the block in the sawcut.

This method is relatively complicated and time-wasting and necessitates that the bottom of the sawcut is in horizontal position. Experiments have therefore been made for substituting the smooth sawblades by blades having teeth of so called hard-metal or some other extremely hard material and therefore adapted for working the stone material with a proper cutting effect, whereby the cutting operation may be most effectively furthered. The said hard-metal teeth are, however, relatively expensive, and it is thus important to prevent their being exposed to damage during the sawing. It has been found that such teeth should be made so as to cut during movement of the sawblade in one direction only, while in the other direction they do not sustain to be forcibly engaged with the work piece, and, consequently, when working in the latter direction they should be kept free from the work piece. It is very important that during its operative stroke the sawblade should engage the work piece along a smooth curve, so that each of the saw teeth gradually works into the work piece. Thus, in the beginning of this operative stroke the teeth should be exposed to a small pressure only, which then is increased successively according as the operative stroke proceeds and the curve of motion of the saw blade is lowered deeper into the work piece.

One object of the invention is to enable such successive motion of the saw blade along a smooth curve.

A further object is to provide a driving mechanism for the saw blade comprising one or more rotatable eccentrics or other driving members arranged so as to apply the saw teeth against the work piece gradually along a smooth or soft curve at the said lowering motion during the operative stroke of the saw blade.

With a saw blade of this kind it is not necessary to supply sand to the saw cut. On the contrary it is desirable that the latter should be kept as clean as possible of silt, so that the saw blade is not unnecessarily exposed to wear. The rinsing away of the silt is essentially facilitated because in the reverse direction the saw teeth according to the invention are kept uplifted from the bottom of the saw cut.

A still further object of the invention is to provide spacious recesses in the blade between the teeth so as to make room for the protuberances formed in the bottom of the saw cut due to the curve motion of the saw teeth. These recesses also prevent the saw dust or silt from being compressed or pushed upwards along the sides of the blade; the silt in the saw cut being instead conveyed towards the end of the cut during the operation of the saw. Furthermore the stone block may be placed in an inclined position so as still more to facilitate the outflow of the silt. Besides the saw blade may be operated at any inclination including vertical and horizontal directions.

To illustrate the invention one embodiment is shown schematically on the accompanying drawings, in which Figure 1 illustrates a plan view of a saw device according to the invention, Figure 2 a side elevation thereof, and Figure 3 an end view.

Figure 4 shows a part of a saw blade according to the invention with the paths of movement indicated with dotted lines, and Figure 5 shows an eccentric device in section on a larger scale.

According to Figures 1–3 the device comprises a saw frame 1, in which a suitable number of saw blades 2 are arranged. The saw frame is suspended on arms 4 to oscillate by means of bearings or pivots 3. At its upper end each of the said arms, in turn, is swingably pivoted on a bearing sleeve 5 (Fig. 5) suspended on an eccentric or a cam 7 fixed on a shaft 6. The shaft 6 is rotatably mounted in bearings 8, which are mounted on a bearing-bracket 9. The bearing-brackets are supported by feeding screws 10 or other devices for vertically adjusting the level position of the bearing brackets and thereby also that of the saw frame and the engaging pressure of the saw blades respectively. The whole device is guided vertically by beams 11, which the bearing brackets 9 engage.

The saw frame 1 is oscillated by means of a suitable mechanism, e. g. consisting of one or more connecting rods 12, one end of which is pivoted to the frame 1, while the other end is connected with a crank 13, which is rotated by a crank shaft 14. The latter is driven from a suitable source of power, e. g. through a pulley 16 and is mounted on a base plate 15 by means of bearing jacks. By means of a suitable transmission, e. g. consisting of sprockets 17, 18 and a chain 19, the shaft 14 also drives an intermeate shaft 20, rotatably mounted in bearings 21. The latter are supported by beams 22, capable of oscillating on the shaft 14. The shaft 20 in its turn drives another transmission, e. g. consisting of sprockets 23, 24 and a chain 25, which drives the aforesaid shaft 6 of the eccentric or cam 7. Two shafts 6 being suitably arranged, viz. one for each pair of the arms 4, a motion transmission, e. g. consisting of sprockets 26, 27 and a chain 28, is arranged between the said shafts 6. The beams 22 are braced by means of jointingly fixed rods 29, which are connected to the shaft 6.

The saw blade according to Fig. 4 consists of a blade 30 of steel or the like with teeth 31 attached thereon. The teeth consist of hard carbids, sintered hard-metal alloys or similar hard material, considerably harder than the blade 30. Between the said teeth are spacious recessess 32 arranged in the saw blade so as to leave room for the saw dust, respectively the silt and for the protuberances in the bottom of the saw cut. Preferably the saw teeth are somewhat thicker than the blade 30 to prevent its jamming. Water may be sprayed by means of special jet tubes spraying over the whole stone, whereby the water can flow down between the saw blade and the sides of the saw cut to wash away the silt.

In the operation of the device the saw frame is oscillated by means of the connecting rods 12, so that the saw blade or saw blades, which by means of the screws 10 are pressed against the underlying stone block (not shown) with a suitable pressure, cut with their teeth into the stone material at every working stroke (in the direction of the arrow P in Fig. 4). As shown in Fig. 4, the teeth 31 hereby move along a curved path of engaging motion as indicated at the chain-dotted lines 33. The eccentrics 7 are so adjusted in relation to the movement of the connection rod 12 that the reverse movement of the saw blade in the opposite direction of the arrow P is effected in an uplifted position, e. g. along a path 34. According as the sawing proceeds the screws 10 are tightened in the ordinary way.

The invention is not limited to the embodiment shown and described but may be modified in different ways without departing from the idea of the invention. Thus for instance the described moving and uplifting devices may be substituted by otherwise constructed mechanisms. The invention may also be adapted for sawing in other hard material than stone.

What I claim is:

1. In a sawing machine for sawing stone or the like of the type described in combination at least one saw blade suspended oscillatably in transversal direction by means of at least one arm mounted on a rotatable eccentric; and a driving mechanism for imparting to said saw blade a reciprocating longitudinal movement and for rotating said rotatable eccentric in a continuous rotation so as to move said saw blade into engagement with the work piece gradually along a soft curve during the operative stroke of said saw blade and to keep the saw blade raised free from cutting engagement with the work piece during the return stroke.

2. In a sawing machine for sawing stone or the like of the type described in combination at least one horizontally arranged saw blade having cutting teeth of hard metal effecting cutting operation in merely one direction of movement of the saw blade, said saw blade being suspended oscillatably in vertical direction by means of at least one oscillatable suspension arm; and a driving mechanism for imparting to said saw blade a reciprocating horizontal longitudinal movement and for oscillating said oscillatable suspension arm in vertical direction so as to move said hard metal saw teeth in a closed circulation path, during the first portion of which the teeth are brought into engagement with the work piece gradually along a soft curve during the operative stroke of said saw blade while keeping the hard metal saw teeth raised free from cutting engagement with the work piece during the whole return stroke of said path.

3. In a sawing machine for sawing stone or the like of the type described in combination at least one horizontally arranged saw blade; suspension means holding said saw blade; rotatable eccentric means asssociated with said suspension means so as to oscillate the same together with said saw blade in vertical direction during rotation of said rotatable eccentric means; and a driving mechanism for imparting to said saw blade a reciprocating horizontal longitudinal movement and for imparting to said rotatable eccentric means a continuous rotation so as to move said saw blade into engagement with the work piece gradually along a soft curve at an acute angle to the work piece during the operative stroke of said saw blade and to keep the saw blade lifted from cutting engagement with the work piece during the return stroke.

4. In a sawing machine for sawing stone or the like of the type described in combination at least one horizontally arranged saw blade having cutting teeth of extremely hard metal effecting cutting operation in one direction of movement of the saw blade merely; rotatable eccentric cam means asssociated with said horizontally arranged saw blade so as to be adapted to oscillate said horizontally arranged saw blade in vertical direction during rotation of said rotatable eccentric means; and a driving mechanism for imparting to said horizontally arranged saw blade a reciprocating horizontal longitudinal movement and for rotating said rotatable eccentric means in a continuous rotation so as to move said hard metal saw teeth into engagement with the work piece gradually along a soft curve during the operative stroke of said saw blade while keeping the hard metal saw teeth free from cutting engagement with the work piece during the return stroke of the saw blade.

5. In a sawing machine for sawing stone or the like of the type described in combination at least one saw blade arranged reciprocatably in longitudinal direction and oscillatably in transversal direction; rotatable eccentric means asssociated with said saw blade so as to oscillate the same in transversal direction during rotation of said rotatable eccentric means; and a driving mechanism for imparting to said saw blade a reciprocating movement in longitudinal direction and for rotating said rotatable eccentric means in a continuous rotation so as to oscillate said saw blade in transversal direction moving it into engagement with the work piece gradually along a soft curve during the operative stroke of said saw blade and out of engagement with the work piece throughout the whole return stroke of said saw blade.

IVAN FREDRIK LUNDQUIST.

REFERENCES CITED

The following references are of record in the file of this patent:

UNITED STATES PATENTS

| Number | Name | Date |
|---|---|---|
| 108,424 | Young | Oct. 18, 1870 |
| 113,993 | Emerson | Apr. 25, 1871 |
| 423,378 | Drummond | Mar. 11, 1890 |
| 2,189,780 | D'Avancourt | Feb. 13, 1940 |